United States Patent
Kim et al.

(10) Patent No.: US 11,299,113 B2
(45) Date of Patent: Apr. 12, 2022

(54) DEVICE FOR ASSISTING SAFE EXIT FROM VEHICLE, SYSTEM HAVING THE SAME, AND METHOD THEREOF

(71) Applicants: Hyundai Motor Company, Seoul (KR); Kia Motors Corporation, Seoul (KR)

(72) Inventors: Gyun Ha Kim, Incheon (KR); Eung Hwan Kim, Seoul (KR); Dae Yun An, Anyang-si (KR); Seul Ki Jeon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 358 days.

(21) Appl. No.: 16/384,101

(22) Filed: Apr. 15, 2019

(65) Prior Publication Data
US 2020/0180528 A1 Jun. 11, 2020

(30) Foreign Application Priority Data
Dec. 7, 2018 (KR) .......................... 10-2018-0157361

(51) Int. Cl.
*B60R 22/00* (2006.01)
*B60R 16/023* (2006.01)
*B60W 50/00* (2006.01)
*B60R 21/0132* (2006.01)
*E05B 77/04* (2014.01)

(52) U.S. Cl.
CPC ...... *B60R 16/0232* (2013.01); *B60R 21/0132* (2013.01); *B60W 50/0098* (2013.01); *E05B 77/04* (2013.01); *B60W 2050/0005* (2013.01); *B60W 2554/00* (2020.02)

(58) Field of Classification Search
CPC ............ B60R 16/0232; B60R 21/0132; B60R 21/013; B60R 16/023; B60R 22/00; B60W 50/0098; B60W 2554/00; B60W 2050/0005; E05B 77/04; B60Q 9/008; B60J 5/04
USPC .......................................................... 701/49
See application file for complete search history.

(56) References Cited

U.S. PATENT DOCUMENTS

| 5,571,315 A | * | 11/1996 | Smith ....................... C09K 8/64 106/285 |
| 10,428,559 B1 | * | 10/2019 | Nepomuceno ........ G01S 13/931 |
| 10,704,301 B2 | * | 7/2020 | Kim ......................... E05B 81/64 |
| 10,767,403 B2 | * | 9/2020 | Aravkin ................ E05C 17/006 |
| 10,829,966 B1 | * | 11/2020 | Chan ......................... G08G 1/16 |

(Continued)

FOREIGN PATENT DOCUMENTS

KR 20140103236 A 8/2014

*Primary Examiner* — Shardul D Patel
(74) *Attorney, Agent, or Firm* — McDonnell Boehnen Hulbert & Berghoff LLP (57) ABSTRACT

The present disclosure relates to a device for assisting a safe exit from a vehicle, a system having the same, and a method thereof. The device for assisting a safe exit from a vehicle may include a processor for determining a surrounding situation around the vehicle and an intent of the passenger to exit from the vehicle, and performing a step-by-step notification based on the determination, and storage for receiving, from the processor, and storing information about the surrounding situation and a determination result of the intent of the passenger to exit from the vehicle.

20 Claims, 8 Drawing Sheets

(56) References Cited

U.S. PATENT DOCUMENTS

| | | | |
|---|---|---|---|
| 2005/0159875 A1* | 7/2005 | Chia | G01S 13/931 |
| | | | 701/93 |
| 2011/0175752 A1* | 7/2011 | Augst | B60R 1/00 |
| | | | 340/905 |
| 2014/0103236 A1* | 4/2014 | Zhang | F16K 3/02 |
| | | | 251/122 |
| 2014/0218529 A1* | 8/2014 | Mahmoud | H04N 5/232411 |
| | | | 348/148 |
| 2014/0343750 A1* | 11/2014 | Minemura | B60W 50/04 |
| | | | 701/1 |
| 2017/0010176 A1* | 1/2017 | Inoue | F02C 6/18 |
| 2017/0080929 A1* | 3/2017 | Sawamoto | B60W 30/0956 |
| 2017/0218678 A1* | 8/2017 | Kothari | B60Q 1/323 |
| 2019/0153771 A1* | 5/2019 | Kothari | E05F 15/73 |
| 2019/0265703 A1* | 8/2019 | Hicok | G06Q 50/30 |
| 2019/0322215 A1* | 10/2019 | Tsang | B60J 5/04 |
| 2019/0376324 A1* | 12/2019 | Walawender | B60R 25/30 |

\* cited by examiner

DEVICE FOR ASSISTING SAFE EXIT FROM VEHICLE, SYSTEM HAVING THE SAME, AND METHOD THEREOF

CROSS REFERENCE TO RELATED APPLICATION

This application claims the benefit of priority to Korean Patent Application No. 10-2018-0157361, filed in the Korean Intellectual Property Office on Dec. 7, 2018, the entire contents of which are incorporated herein by reference.

TECHNICAL FIELD

The present disclosure relates to a device for assisting a safe exit from a vehicle, a system having the same, and a method thereof.

BACKGROUND

Recently, as vehicle technology has developed, various vehicle services for user convenience have been provided. One example of such vehicle technology for user convenience is a safe exit assist (SEA) function that detects, when a passenger exits from the vehicle, an external object approaching from a rear lateral side of the vehicle to prevent a collision between the object and the passenger who is exiting.

This safe exit assist function controls, when the object is approaching from a rear lateral side of the vehicle, and when attempting to unlock a child lock, to keep the child lock state. In addition, the safe exit assist function alerts the passenger via a cluster pop-up and a sound notification when the object is approaching from a rear lateral side of the vehicle in a child lock unlocked state.

However, the conventional safe exit assist function only keeps a door in a locked state when a risk is detected when the child lock is in an ON state. However, when the child lock is executed, a back-seat passenger may not able to operate a window as well as to open and close the door. Therefore, the user feels inconvenience, and frequently does not turn on the child lock even though a child is in the back-seat.

SUMMARY

The present disclosure has been made to solve the above-mentioned problems occurring in the prior art while advantages achieved by the prior art are maintained intact.

An aspect of the present disclosure provides a device for assisting a safe exit from a vehicle, a system having the same, and a method thereof that determines and notifies whether a passenger exiting from the vehicle is in a risky state based on a determination of a surrounding situation around the vehicle and an intent of the passenger to exit from the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for assisting a safe exit from a vehicle includes a processor for determining a surrounding situation around the vehicle and an intent of the passenger to exit from the vehicle, and performing a step-by-step notification based on the determination, and storage for receiving, from the processor, and storing information about the surrounding situation and a determination result of the intent of the passenger to exit from the vehicle.

According to an aspect of the present disclosure, the processor may perform a primary notification when an external object approaching from a rear lateral side of the vehicle is detected.

According to an aspect of the present disclosure, the processor may display a notification message or a notification image on a display or turn on a door lamp for the primary notification.

According to an aspect of the present disclosure, the processor may perform the primary notification when the external object approaches a rear-side of a seat occupied by the passenger is detected.

According to an aspect of the present disclosure, the processor may determine that the passenger has the intent to exit from the vehicle when at least one of following cases is detected while a seat belt is unfastened, of which a case when the passenger moves toward a position which the external object is drawing closer to, a case when a hand of the passenger touches a door handle, and a case when the hand of the passenger is approaching the door handle.

According to an aspect of the present disclosure, the processor may perform a secondary notification when it is determined that the passenger has the intent to exit from the vehicle.

According to an aspect of the present disclosure, in the performing of the secondary notification, the processor may perform a door lock control together.

According to an aspect of the present disclosure, the processor may perform at least one of a seat vibration, a door handle vibration, a sound warning, and a rendering of a door lamp in different colors for the secondary notification.

According to an aspect of the present disclosure, a vehicle system includes a device for assisting a safe exit from a vehicle for determining a surrounding situation around the vehicle and an intent of a passenger to exit from the vehicle, and performing a step-by-step notification based on the determination, and a sensing module for sensing the surrounding situation and a movement of the passenger.

According to an aspect of the present disclosure, the sensing module may include an interior radar sensor for sensing the movement of the passenger in the vehicle, a seat belt sensor for detecting whether a seat belt of the vehicle is fastened, and a rear-side radar sensor for sensing a movement of an external object from a rear lateral side of the vehicle or a camera for capturing an object near a rear and lateral face of the vehicle.

According to an aspect of the present disclosure, the device may perform a primary notification when an external object approaching from a rear lateral side of the vehicle is detected, and a secondary notification when the passenger has the intent to exit from the vehicle.

According to an aspect of the present disclosure, the device may display a notification message or notification image on a display, or turn on a door lamp for the primary notification.

According to an aspect of the present disclosure, the device may determine that the passenger has the intent to exit from the vehicle when at least one of following cases is detected while a seat belt is unfastened, of which a case when the passenger moves toward a position which the external object is drawing closer to, a case when a hand of the passenger touches a door handle, and a case when the hand of the passenger is approaching the door handle.

According to an aspect of the present disclosure, the device may perform a secondary notification when it is determined that the passenger has the intent to exit from the vehicle.

According to an aspect of the present disclosure, the device may perform at least one of a seat vibration, a door handle vibration, a sound warning, and a rendering of a door lamp in a different color for the secondary notification.

According to an aspect of the present disclosure, a method for assisting a safe exit from a vehicle may include sensing a surrounding situation around the vehicle, determining an intent of a passenger to exit from the vehicle, and performing a step-by-step notification based on the sensed surrounding situation and the determined intent of the passenger to exit from the vehicle.

According to an aspect of the present disclosure, the sensing of the surrounding situation around the vehicle may include sensing whether an external object approaching from a rear lateral side of the vehicle exists.

According to an aspect of the present disclosure, the determining of the intent of the passenger to exit from the vehicle may include determining that the passenger has the intent to exit from the vehicle when at least one of following cases is detected while a seat belt is unfastened, of which a case when the passenger moves toward a position which an external object is drawing closer to, a case when a hand of the passenger touches a door handle, and a case when the hand of the passenger is approaching the door handle.

According to an aspect of the present disclosure, the performing of the step-by-step notification may include performing a primary notification when the external object approaches a rear-side of a seat occupied by the passenger is detected, and performing a secondary notification when it is determined that the passenger has the intent to exit from the vehicle.

According to an aspect of the present disclosure, the method for assisting a safe exit from a vehicle may further include performing a door lock control together in the performing of the secondary notification.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure may be applied to a Safe Exit Assist (SEA) system. The present disclosure discloses a configuration in which a step-by-step notification is issued to notify a risky situation when a back-seat passenger exits based on a state of the back-seat passenger and a surrounding situation even when a child lock mode is not set.

Hereinafter, with reference to FIGS. 1 to 8, embodiments of the present disclosure will be described in detail.

Figure 1:
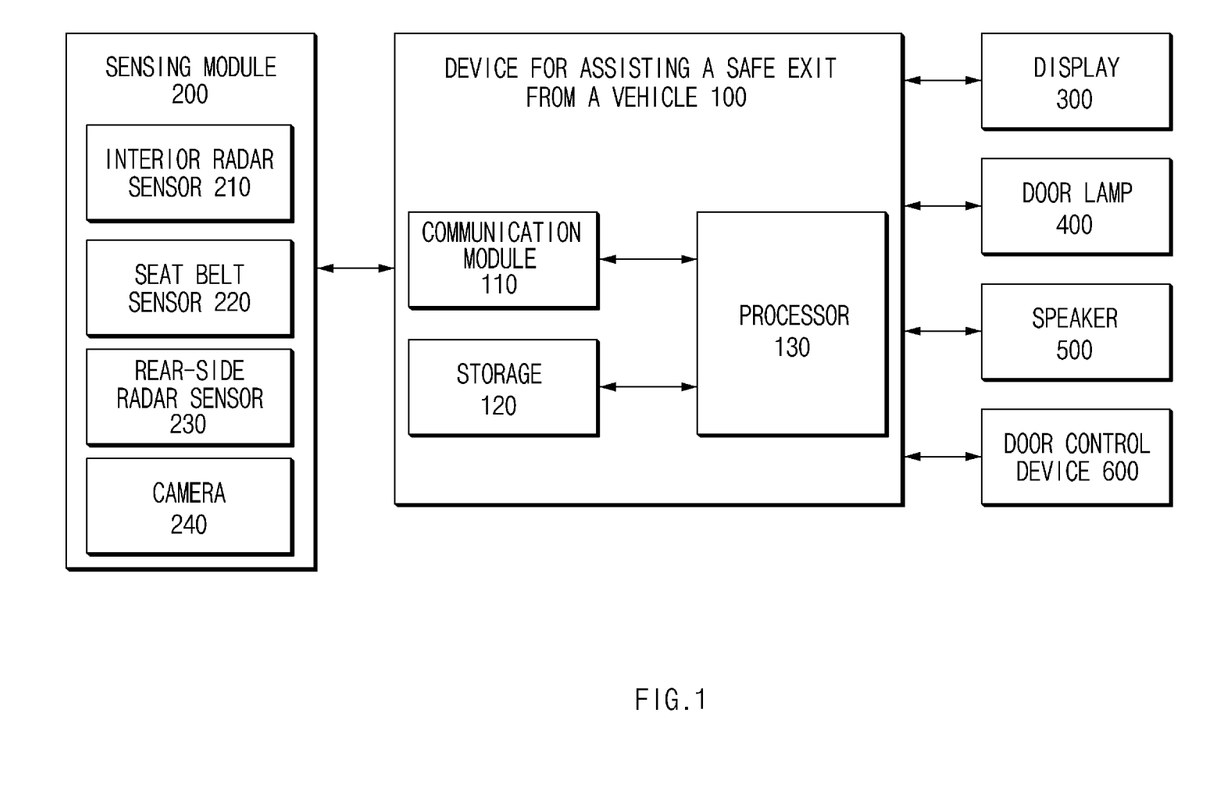
FIG. 1 is a block diagram illustrating a configuration of a vehicle system including a device for assisting a safe exit from a vehicle according to an embodiment of the present disclosure.

FIG. 1 is a block diagram illustrating a configuration of a vehicle system including a device for assisting a safe exit from a vehicle according to an embodiment of the present disclosure.

With reference to FIG. 1, the vehicle system according to an embodiment of the present disclosure may include a device 100 for assisting a safe exit from a vehicle, a sensing module 200, a display 300, a door lamp 400, a speaker 500, and a door control device 600.

The device 100 for assisting a safe exit from a vehicle may determine a surrounding situation (whether an external object is approaching from a rear lateral side of the vehicle) and an intent of a passenger to exit from the vehicle, and perform a step-by-step notification.

To this end, the device 100 for assisting a safe exit from a vehicle may include a communication module 110, storage 120, and a processor 130.

The communication module 110 is a hardware device implemented in various electronic circuits for transmitting and receiving a signal via a wireless or wired connection. In the present disclosure, the communication module 110 performs an in-vehicle communication via a CAN communication and a LIN communication. The communication module 110 may communicate with the sensing module 200, the display 300, the door lamp 400, the speaker 500, and the like.

The storage 120 may store a sensing result from the sensing module 200, and information on the surrounding situation and a determination result of the intent of the passenger to exit from the vehicle acquired by the processor 130, and the like. The storage 120 may include at least one type of a storage medium of at least one type of memory such as a flash memory type, a hard disk type, a micro type, and a card type (for example, an SD card (Secure Digital Card) or an XD card (eXtream Digital Card)) memory, and the like, and a RAM (Random Access Memory), SRAM (Static RAM), ROM (Read Only Memory), PROM (Programmable ROM), EEPROM (Electrically Erasable PROM), MRAM (Magnetic RAM), a magnetic disk, and an optical disk type memory.

The processor 130 may be electrically connected to the communication module 110, the storage 120, and the like, and may electrically control each of the components, and may be an electric circuit for executing a command of a software, thereby performing various data processing and calculation, which will be described below.

The processor 130 may determine the surrounding situation and the intent of the passenger to exit from the vehicle, and perform the step-by-step notification.

The processor 130 performs a primary notification when the external object approaching from a rear lateral side of the vehicle is detected. When an external object approaches a rear-side of a seat occupied by the passenger, the processor 130 may perform the primary notification. For example, when the passenger is seated on a right rear-seat, the passenger is likely to open a right door. Therefore, the primary notification may be performed based on whether the external object in right rear of the vehicle approaching the vehicle is detected.

The processor 130 may display a notification message or a notification image on the display 300, or may turn on the door lamp 400 for the primary notification. For example, the processor 130 may flicker the notification message or the notification image to highlight those during the primary notification, or may render the door lamp 400 in yellow.

The processor 130 may determine that the passenger has the intent to exit from the vehicle when at least one of following cases is detected: when a seat belt is unfastened; when a movement of the passenger to a door to which the external object is approaching is detected; when a hand of the passenger touches a door handle (the hand of the passenger is laid on the door handle, or holds the door handle); and when the hand of the passenger approaches the door handle. In this connection, the processor 130 may determine whether the seat belt is unfastened based on a detection result of a seat belt sensor 220. In addition, the processor 130 may detect the movement of the passenger via an interior radar sensor 210 to determine a change in a position of the passenger. That is, the processor 130 may determine the position change of the passenger using a frequency change, a phase difference, a size, a time, and the like of a radar signal that is transmitted toward the passenger, and reflected by the passenger. Further, video data of an interior camera may be analyzed to determine the change in the position of the passenger. In addition, the processor 130 may determine whether the hand of the passenger has reached the door handle using the interior radar sensor 210. A travel distance of a light-beam emitted from the interior radar sensor 210 and reaching the hand of the passenger and returning to the interior radar sensor 210 when the hand of the passenger is approaching the door handle is smaller than a travel distance of a light-beam emitted from the interior radar sensor 210 and reaching the handle and returning to the interior radar sensor 210 when the hand of the passenger is not approaching the door handle. Using this fact, the processor 130 may determine whether the hand of the passenger is approaching the door handle. Further, the processor 130 may analyze the video data of the interior camera to determine whether the hand of the passenger has moved to the door handle side. In this connection, a state in which the hand of the passenger has reached the door handle may include states in which: the hand of the passenger is laid on the door handle; the hand of the passenger is positioned near the door handle; and the hand of the passenger is laid above a top of the door handle while not touching the door handle, and the like.

Upon determining that the passenger has the intent to exit from the vehicle, the processor 130 may perform a secondary notification, and a door lock control together for a safety of the passenger.

The processor 130 may perform at least one of a seat vibration, a door handle vibration, a sound warning, and a rendering of the door lamp 400 in different colors for the secondary notification. In this connection, the processor 130 may render the door lamp 400 in colors different from in the primary notification. For example, when the door lamp 400 is rendered in green in the primary notification, the processor 130 may control the door lamp 400 to be rendered in red in the secondary notification. Further, the processor 130 may also control the door lamp 400 to be flickered for highlighting a risk in the secondary notification. Further, the processor 130 may perform the sound warning through the speaker 500, and may differently set volumes of the sound based on a degree of risk.

In the present disclosure, the step-by-step notification is classified into the primary notification and the secondary notification, but is not limited thereto. The notification may be further subdivided based on a level of risk, and performed.

The sensing module 200 may include a plurality of sensors for sensing interior and exterior of the vehicle. The sensing module 200 may include the interior radar sensor 210, a seat belt sensor 220, a rear-side radar sensor 230, and a camera 240.

The interior radar sensor 210 may sense the movement (direction, position, and the like) of the passenger, the distance to the door handle, and the like, and provides the same to the device 100 for assisting a safe exit from a vehicle.

The seat belt sensor 220 may detect whether the seat belt of the passenger is fastened, and provides the detection result to the device 100 for assisting a safe exit from a vehicle.

The rear-side radar sensor 230 may sense the external object approaching from a rear lateral side of the vehicle. In this connection, the rear-side radar sensor 230 may acquire information on a location of the external object, a speed of the external object, a moving direction of the external object and/or a type of the external object (e.g., a vehicle, a pedestrian, a bicycle, a motorcycle, or the like), and provide the same to the device 100 for assisting a safe exit from a vehicle. The rear-side radar sensor 230 may include a BSD (Blind Spot Detection).

The camera 240 includes cameras mounted inside the vehicle, at a rear and lateral face, and the like of the vehicle. The movement of the passenger is captured by the camera mounted in the interior of the vehicle, and an outside of the vehicle is captured by the camera mounted at the rear and lateral face of the vehicle. Images of the movement of the passenger and the outside of the vehicle as captured are provided to the device 100 for assisting a safe exit from a vehicle. Accordingly, the device 100 for assisting a safe exit from a vehicle may determine a change of the movement of the passenger from video data filmed by the camera mounted interior of the vehicle, and may determine a presence of the external object approaching from a rear lateral side of the vehicle from video data of the rear and lateral of the vehicle.

The display 300 may display the primary notification and the secondary notification based on the detection result of the approaching of the object from a rear lateral side of the vehicle. In this connection, the primary notification may be a message or an image indicating that there is the object approaching from a rear lateral side of the vehicle, and may be highlighted by changing a color of the message or the image, or by flickering the message and the image.

The display 300 may be implemented in a head-up display (HUD), a cluster, an AVN (Audio Video Navigation), and the like. Further, the display 300 may include at least one of a liquid crystal display (LCD), a thin film transistor-LCD (TFT LCD), a light emitting diode (LED), an organic LED (OLED), an active Matrix OLED (AMOLED), a flexible display, a bended display, and a three-dimensional (3D) display. Some of these displays may be implemented as transparent displays that are transparent or optically clear to allow viewing of the exterior. In addition, the display 300 may be provided as a touch screen including a touch panel, and may be used as an input device in addition to an output device.

The door lamp 400 may be controlled by the device 100 for assisting a safe exit from a vehicle, and may be lighted during the primary and secondary notifications. In this connection, lighting colors in the primary notification and the secondary notification may be set differently.

The speaker 500 may be controlled by the device 100 for assisting a safe exit from the vehicle, and may output the sound warning during the secondary notification.

Under control of the device 100 for assisting a safe exit, the door control device 600 may enable/disable the opening of the door, and may output door handle vibration in response to the secondary notification.

The seat is not shown in the present disclosure, but the secondary notification may be performed by outputting a vibration to the seat (not shown).

In this way, the present disclosure may determine, when the object approaches from a rear lateral side of the vehicle, the intent of the passenger to exit from the vehicle, and perform the notifications. In addition, the present disclosure may perform the notifications by dividing the notifications into several steps (the primary notification and the secondary notification) to perform the notification in detail based on whether the passenger has the intent to exit from the vehicle. That is, the present disclosure may provide the primary notification when the object 201 approaching from a rear lateral side of the vehicle is sensed by the rear-side radar sensor 230 regardless of determining whether the passenger has the intent to exit from the vehicle. Then, when it is determined that the passenger has the intent to exit from the vehicle via the interior radar sensor 210 and the seat belt sensor 220, and when the object is approaching from a rear lateral side of the vehicle, the present disclosure may perform the secondary notification and the door lock control.

Hereinafter, with reference to FIG. 2, a method for assisting a safe exit from a vehicle according to an embodiment of the present disclosure will be described in detail.

Figure 2:
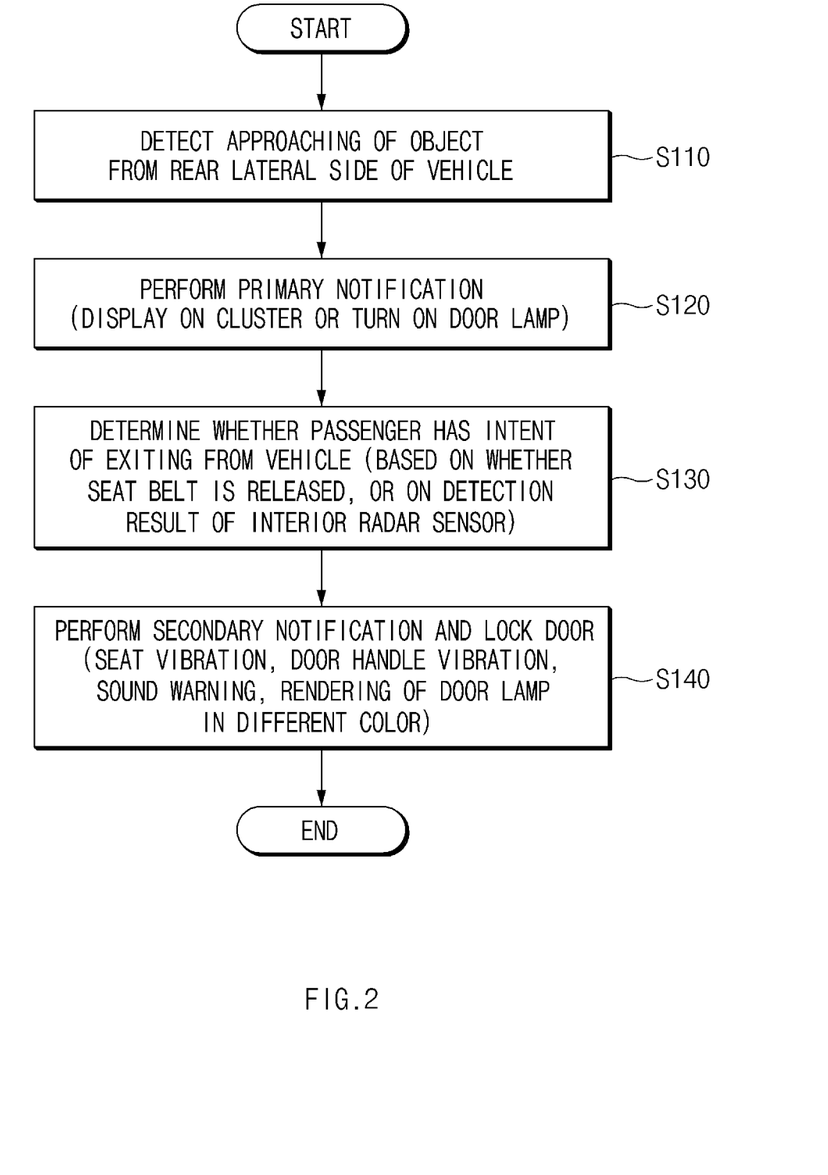
FIG. 2 is a flowchart illustrating a method for assisting a safe exit from a vehicle according to an embodiment of the present disclosure.

FIG. 2 is a flowchart illustrating a method for assisting a safe exit from a vehicle according to an embodiment of the present disclosure.

Hereinafter, it is assumed that the device 100 for assisting a safe exit from a vehicle in FIG. 1 performs processes of FIG. 2. Further, in the description of FIG. 2, it may be understood that operations described as being performed by the device 100 are controlled by the processor 130 of the device 100.

With reference to FIG. 2, the device 100 for assisting a safe exit from a vehicle detects the approaching of the object (vehicle, motorcycle, bicycle, and the like) from a rear lateral side of the vehicle at a speed of less than 3 km/h (S110).

When the object is approaching from a rear lateral side of the vehicle, the device 100 for assisting a safe exit from a vehicle performs the primary notification in operation S120. At this time, the device 100 for assisting a safe exit from a vehicle may control the display such as the cluster, and the like to output the primary notification, or to turning on control the door lamp 400. In this connection, an output content of the primary notification may include the message or the image indicating that there is the object approaching in an exit direction.

The device 100 for assisting a safe exit from a vehicle determines whether the passenger has the intent to exit from the vehicle based on whether the seat belt is fastened, on a detection result of the interior radar sensor 210, and the like (S130).

When it is determined that the passenger has the intent to exit from the vehicle in operation S130, the device 100 for assisting a safe exit from a vehicle performs the secondary notification. In this connection, the secondary notification may include the seat vibration, the door handle vibration, the sound warning, the rendering of the door lamp in different color, and the like (S140).

In this way, the present disclosure may provide the step-by-step notification based on the state of the back-seat passenger (the intent to exit from the vehicle, the movement) without the child lock. Thus, since the child lock is not set, the present disclosure may support the safe exit of the passenger, as well as allow a control of a back-seat window, thereby improving the convenience of the user.

In addition, the present disclosure may determine whether the rear-seat passenger is present, and automatically convert the door to a locked state in a risky situation to induce the safe exit without any additional setting.

Further, the present disclosure utilizes the radar sensor used in existing back-seat passenger collision preventing systems. Therefore, without adding a separate sensor (camera, and the like), the safe exit assist may be performed, thereby saving cost.

Figure 3:
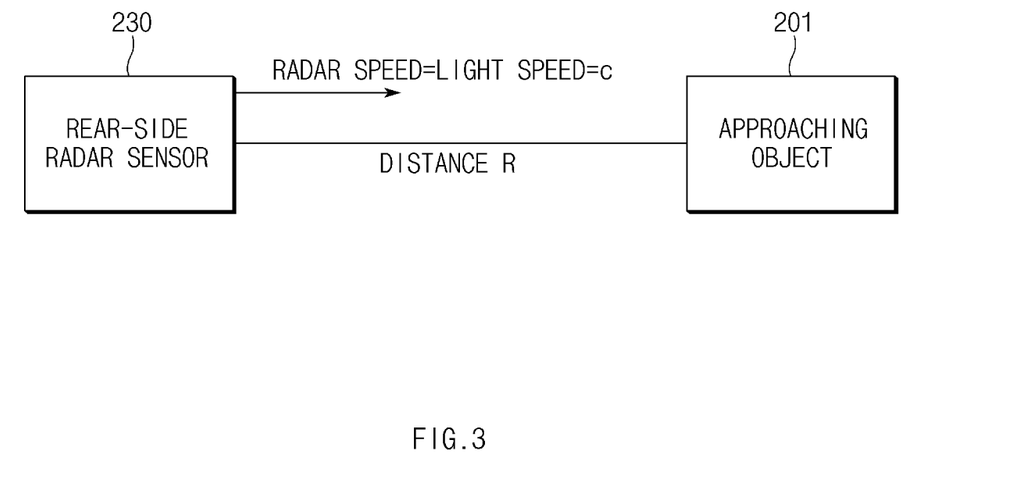
FIG. 3 is a diagram for illustrating a principle for measuring a distance to an object according to an embodiment of the present disclosure.
Figure 4:
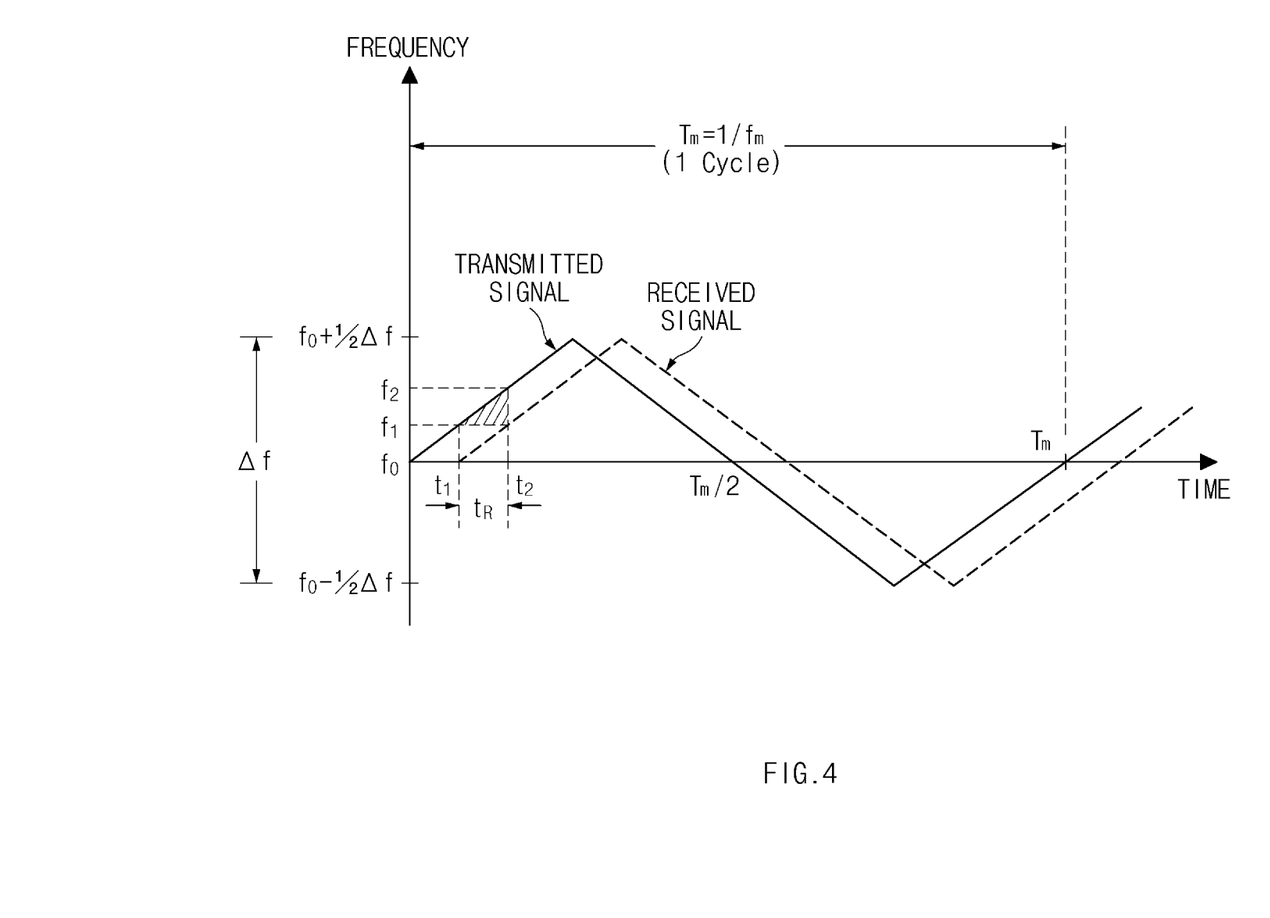
FIG. 4 is a graph for illustrating a distance measurement result based on a frequency change rate based on time according to an embodiment of the present disclosure.

FIG. 3 is a diagram for illustrating a principle for measuring a distance to an object according to an embodiment of the present disclosure. Further, FIG. 4 is a graph for illustrating a distance measurement result based on a frequency change rate based on time according to an embodiment of the present disclosure.

The device 100 for assisting a safe exit from a vehicle may calculate a distance to the object in a FMCW (Frequency Modulated Continuous Wave) method. That is, the device 100 for assisting a safe exit from a vehicle may change a frequency linearly based on time such that time information may be confirmed from a frequency difference of a reflected wave. In this connection, the device 100 for assisting a safe exit from a vehicle is already aware of the time information and a radar speed (=light speed) such that the distance to the object may be calculated. A method for calculating the distance will be described in detail below through Equation 1 to 4.

When a radio wave (light source) with a frequency of $f_1$ is emitted from a transmitter at a time $t_1$, and arrives at the receiver at a time $t_2$, a time $t_R$, which is a time required for the radar wave (light source) to be reflected by the object, and enter the receiver, may be represented as Equation 1 below.

$$t_R = t_2 - t_1 \qquad \text{Equation 1}$$

With reference to FIG. 3, time is a distance divided by a speed. Thus, the time $t_R$, which is the time required for the radar wave (light source) to be emitted and to reach the object, then to be reflected and to enter the receiver, may be represented as Equation 2 below.

$$t_R = 2*R/c \qquad \text{Equation 2}$$

With reference to FIG. 4, a frequency difference $f_R$ at the time $t_2$ is equal to $f_2-f_1$. In FIG. 4, a change rate $f_c$ of the frequency during a time $T_m$ may be represented as Equation 3.

$$f_c = 2*\Delta f / T_m \qquad \text{Equation 3}$$

frequency modulation rate $f_m = 1/T_m$ (∵ a relationship between the frequency and the period, $f=1/T$)

The change rate $f_c$ of the frequency is equal to a slope of the graph in FIG. 4 such that the change rate $f_c$ may be defined as Equation 4.

$$f_c = 2*\Delta f * f_m = f_2 - f_1 / t_R = f_R / t_R \qquad \text{Equation 4}$$

When applying $tR=2*R/c$ into Equation 4 above, a distance R to the object may be expressed as Equation 5 below.

$$R = c f_R / (4 \Delta f * f_m) \qquad \text{Equation 5}$$

The frequency modulation rate $f_m$ and the frequency modulation range $\Delta f$ are already known in designing the radar. Therefore, when only the $f_R$ from the radar sensor is calculated, the distance R to the object may be calculated.

Figure 5:
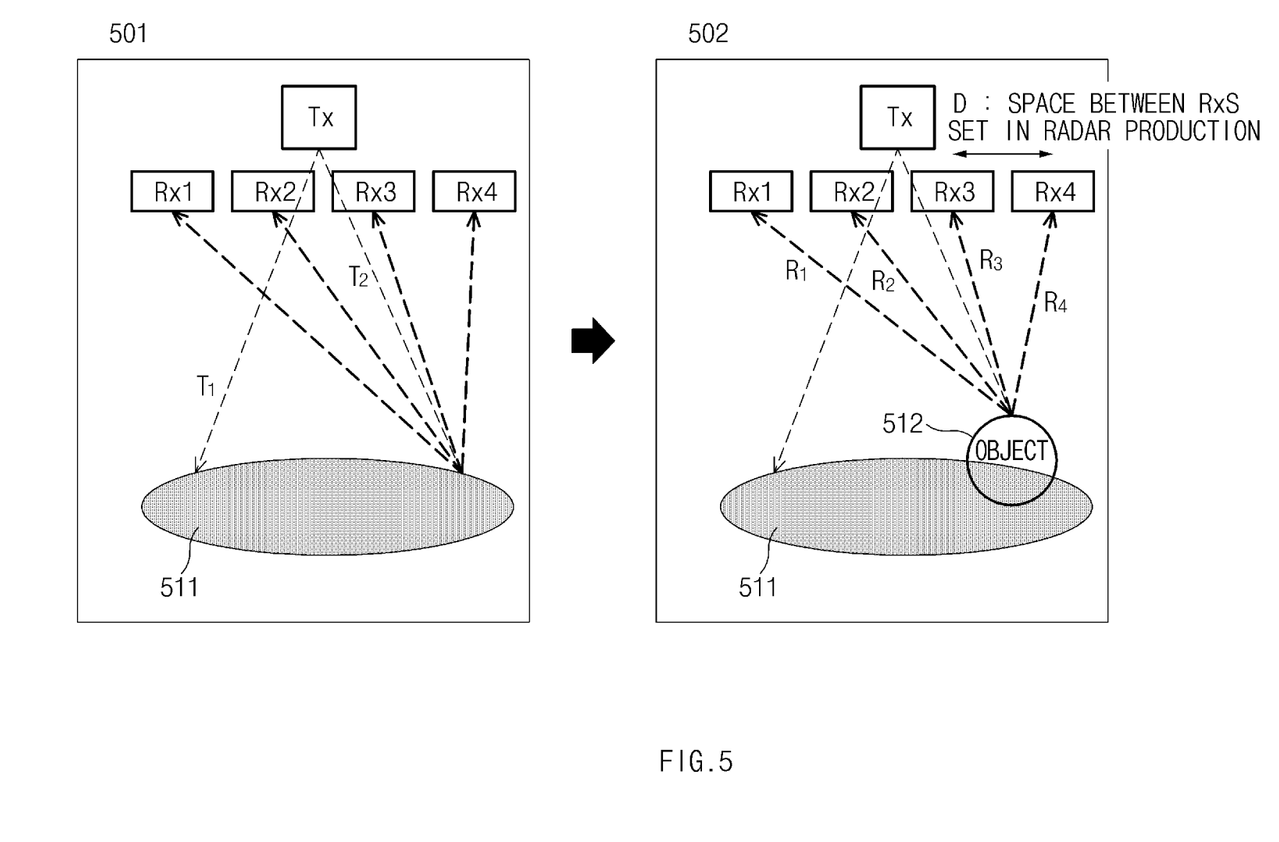
FIG. 5 is a diagram for illustrating a method for detecting a position of an external object according to an embodiment of the present disclosure.

FIG. 5 is a diagram for illustrating a method for detecting a position of an external object according to an embodiment of the present disclosure.

With reference to FIG. 5, when a radar signal is transmitted from a transmitter Tx, reflected within a set sensing range 511 of the radar, then received by receivers Rx1 to Rx4 as shown in 501, and when an external object 512 enters the set sensing range 511 of the radar sensor as shown in 502, a coordinate of the external object 512 may be calculated using differences of distance values between the external object 512 and the receivers Rx1 to Rx4 based on the signals received by the receivers Rx1 to Rx4.

In this way, the device 100 for assisting a safe exit from a vehicle may calculate a coordinate of a target located on a specific space (within the sensing range of the radar sensor).

Figure 6:
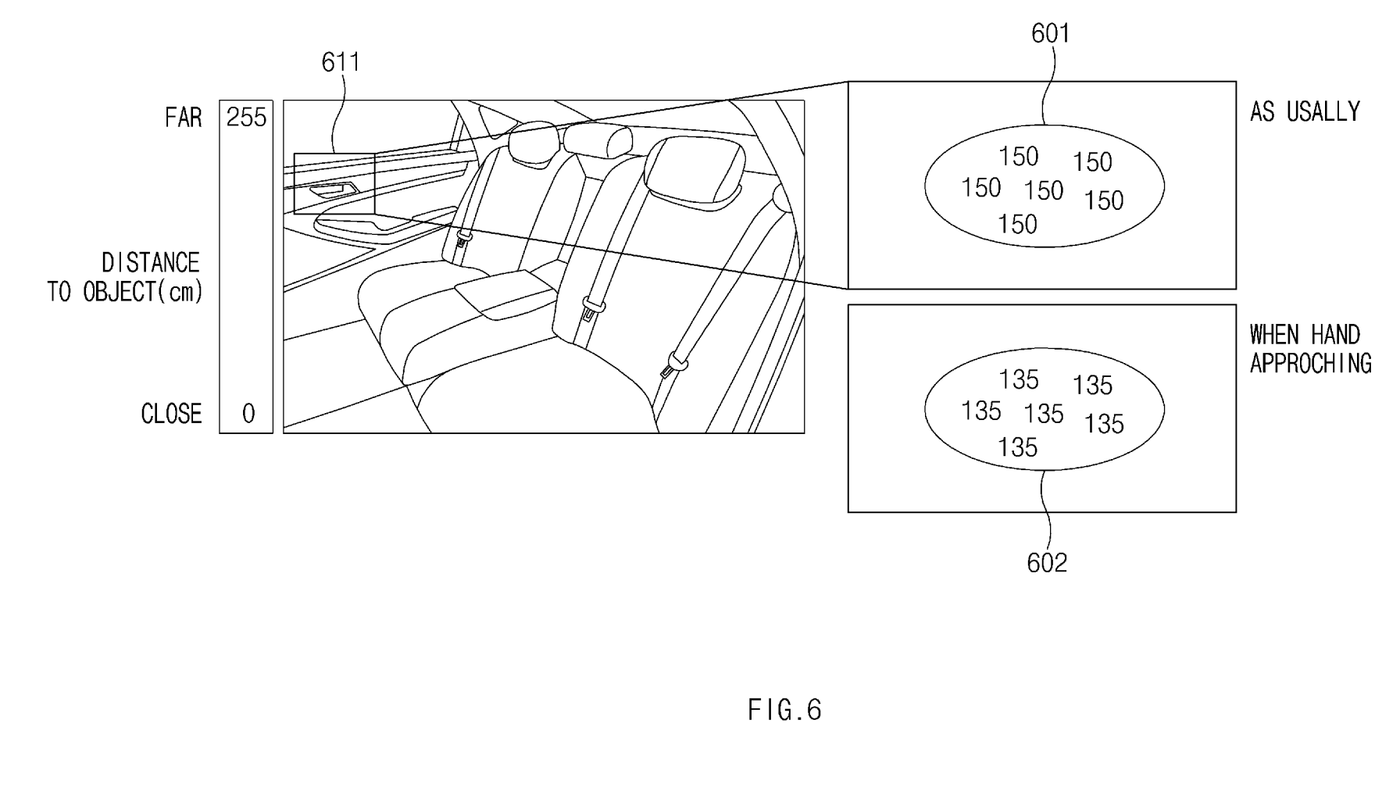
FIG. 6 is a diagram for illustrating a method for detecting a intent of the passenger to exit from the vehicle according to an embodiment of the present disclosure.

FIG. 6 is a diagram for illustrating a method for detecting an intent of a passenger to exit from the vehicle according to an embodiment of the present disclosure. In addition, FIG. 7 is a diagram for illustrating a method for detecting an intent of a passenger to exit from the vehicle based on a state in which a hand of the passenger has reached a door handle, and a state in which the hand of the passenger has not reached the door handle.

As shown in FIG. 6, the interior radar sensor 210 is mounted in the vehicle, and may transmit a light to a door handle 611 to calculate a distance value based on the reflected light.

Figure 7:
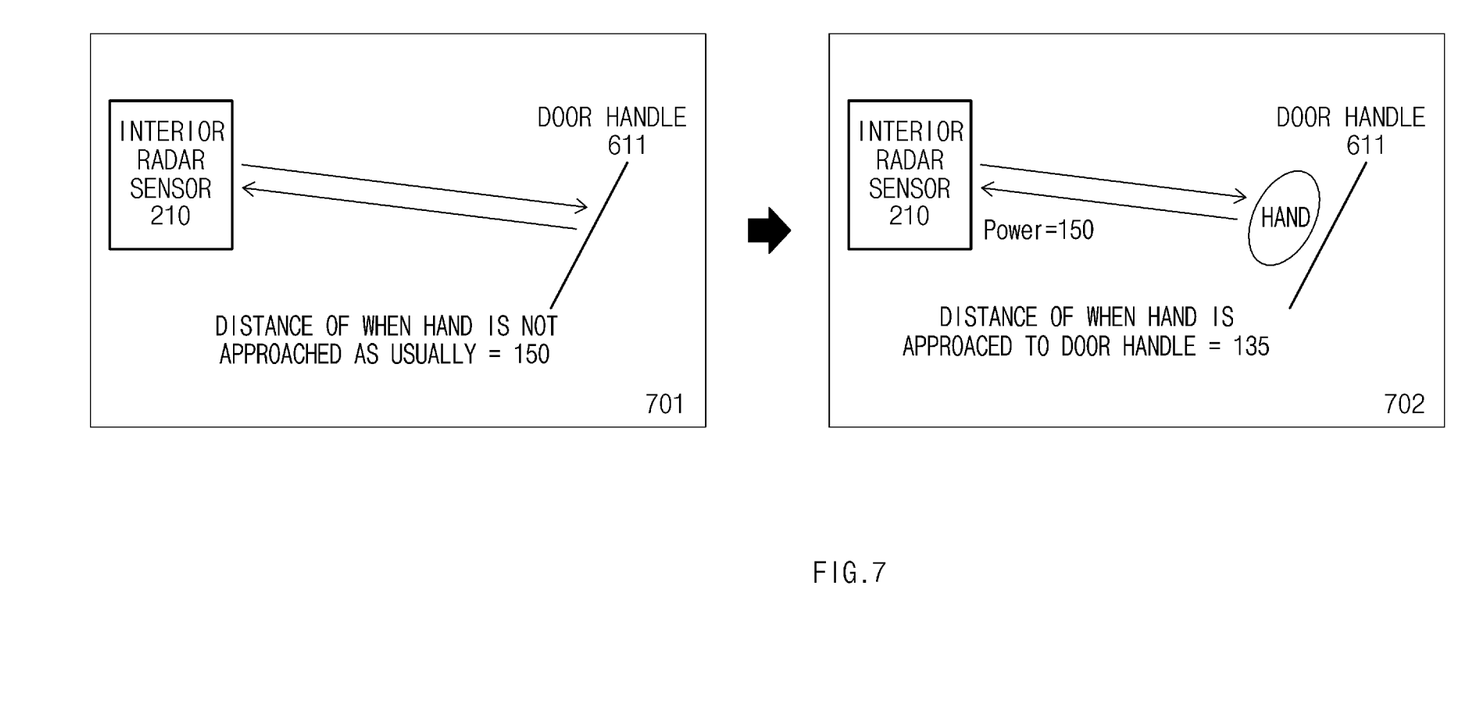
FIG. 7 is a diagram for illustrating a method for detecting an intent of the passenger to exit from the vehicle based on a state in which a hand of the passenger has reached a door handle, and a state in which the hand of the passenger has not reached the door handle.

When the hand of the passenger is not located near the door handle 611 as usual as shown in 601 of FIG. 6 and 701 of FIG. 7, a distance between the interior radar sensor 210 and the door handle 611 may be 150 cm. On the other hand, when the hand approaches the door handle 611 as shown in 602 of FIG. 6 and 702 of FIG. 7, the distance between the interior radar sensor 210 to the door handle 611 may become 135 cm. That is, it may be seen that, when the hand of the passenger approaches the door handle 611, the distance from the interior radar sensor 210 to the door handle 611 becomes shorter. In FIG. 6, the distance (cm) between the door handle 611 and the radar sensor 210 is described as an example, but the radar signal power may be represented by the power. Further, the distance between the door handle 611 and the radar sensor 210 can be calculated using the power of the radar signal.

Figure 8:
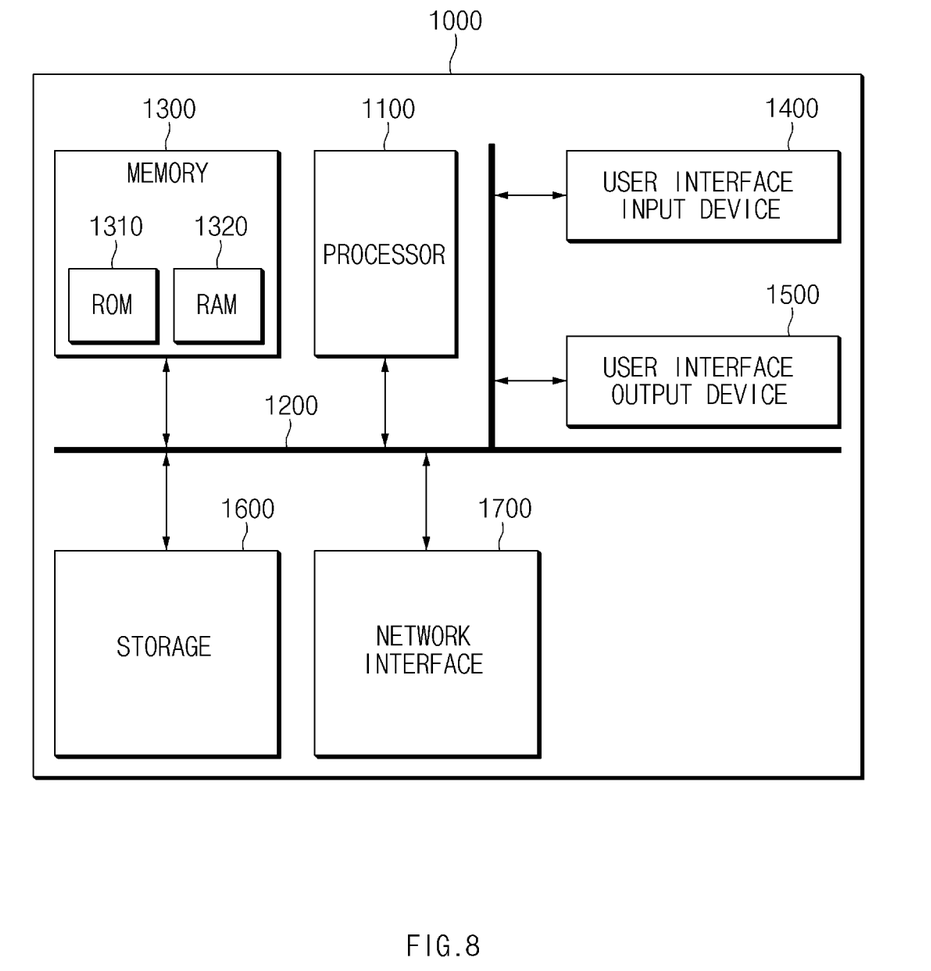
FIG. 8 illustrates a computing system according to an embodiment of the present disclosure.

FIG. 8 illustrates a computing system according to an embodiment of the present disclosure.

With reference to FIG. 8, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The present disclosure may determine whether the passenger exiting from the vehicle is in the risky state based on the determination of the surrounding situation around the vehicle and the intent of the passenger to exit from the vehicle. Then, the present disclosure may, when the passenger is in the risky state, alert the user, and induce a safe exit.

In addition, various effects, directly or indirectly understood through the present specification, may be provided.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The invention claimed is:

1. A device for assisting a safe exit from a vehicle, the device comprising:
a processor configured for determining a surrounding situation around the vehicle and an intent of a passenger to exit from the vehicle, and performing a step-by-step notification based on the determination; and
storage configured for receiving, from the processor, and storing information about the surrounding situation and a determination result of the intent of the passenger to exit from the vehicle,
wherein the processor detects an external object approaching the vehicle using a radar sensor,
the radar sensor calculates a distance to an external object based on a frequency difference between a transmitted signal and a received signal,
the received signal is a radar wave to be reflected by the external object, and
when the external object enters a set sensing range of the radar sensor, the processor calculates a coordinate of the external object using differences of distance values between the external object and receivers based on signals received by the receivers.

2. The device of claim 1, wherein the processor performs a primary notification when the external object approaching from a rear lateral side of the vehicle is detected.

3. The device of claim 2, wherein the processor displays a notification message or a notification image on a display or turns on a door lamp for the primary notification.

4. The device of claim 2, wherein the processor performs the primary notification when the external object approaches a rear-side of a seat occupied by the passenger is detected.

5. The device of claim 2, wherein the processor determines that the passenger has the intent to exit from the vehicle when at least one of following cases is detected while a seat belt is unfastened:
a case when the passenger moves toward a position which the external object is drawing closer to;
a case when a hand of the passenger touches a door handle; and
a case when the hand of the passenger is approaching the door handle.

6. The device of claim 5, wherein the processor performs a secondary notification when it is determined that the passenger has the intent to exit from the vehicle.

7. The device of claim 6, wherein, in the performing of the secondary notification, the processor performs a door lock control together.

8. The device of claim 6, wherein the processor performs at least one of a seat vibration, a door handle vibration, a sound warning, and a rendering of a door lamp in different colors for the secondary notification.

9. A vehicle system comprising:
a device for assisting a safe exit from a vehicle, wherein the device is configured for determining a surrounding situation around the vehicle and an intent of a passenger to exit from the vehicle, and performing a step-by-step notification based on the determination; and
a sensing module for sensing the surrounding situation and a movement of the passenger,
wherein the device detects an external object approaching the vehicle using a radar sensor,
the radar sensor calculates a distance to the external object based on a frequency difference between a transmitted signal and a received signal,
the received signal is a radar wave to be reflected by the external object, and
when the external object enters a set sensing range of the radar sensor, the device calculates a coordinate of the external object using differences of distance values between the external object and receivers based on signals received by the receivers.

10. The vehicle system of claim 9, wherein the sensing module includes:
an interior radar sensor for sensing the movement of the passenger in the vehicle;
a seat belt sensor for detecting whether a seat belt of the vehicle is fastened; and
a rear-side radar sensor for sensing a movement of the external object from a rear lateral side of the vehicle or a camera for capturing an object near a rear and lateral face of the vehicle.

11. The vehicle system of claim 9, wherein the device performs:
a primary notification when the external object approaching from a rear lateral side of the vehicle is detected; and
a secondary notification when the passenger has the intent to exit from the vehicle.

12. The vehicle system of claim 11, wherein the device displays a notification message or notification image on a display, or turns-on a door lamp for the primary notification.

13. The vehicle system of claim 11, wherein the device determines that the passenger has the intent to exit from the vehicle when at least one of following cases is detected while a seat belt is unfastened:
a case when the passenger moves toward a position which the external object is drawing closer to;
a case when a hand of the passenger touches a door handle; and
a case when the hand of the passenger is approaching the door handle.

14. The vehicle system of claim 11, wherein the device performs a secondary notification when it is determined that the passenger has the intent to exit from the vehicle.

15. The vehicle system of claim 14, wherein the device performs at least one of a seat vibration, a door handle vibration, a sound warning, and a rendering of a door lamp in a different color for the secondary notification.

16. A method for assisting a safe exit from a vehicle, the method comprising:
sensing, by a sensing module, a surrounding situation around the vehicle;
determining, by a processor, an intent of a passenger to exit from the vehicle; and
performing, by the processor, a step-by-step notification based on the sensed surrounding situation and the determined intent of the passenger to exit from the vehicle,
wherein the sensing module detects an external object approaching the vehicle using a radar sensor,
the radar sensor calculates a distance to the external object based on a frequency difference between a transmitted signal and a received signal,
the received signal is a radar wave to be reflected by the external object, and
when the external object enters a set sensing rage of the radar sensor, the processor calculates a coordinate of the external object using differences of distance values between the external object and receivers based on signals received by the receivers.

17. The method of claim 16, wherein the sensing of the surrounding situation around the vehicle includes sensing whether the external object approaching from a rear lateral side of the vehicle exists.

18. The method of claim 16, wherein the determining of the intent of the passenger to exit from the vehicle includes determining that the passenger has the intent to exit from the vehicle when at least one of following cases is detected while a seat belt is unfastened:
- a case when the passenger moves toward a position which the external object is drawing closer to;
- a case when a hand of the passenger touches a door handle; and
- a case when the hand of the passenger is approaching the door handle.

19. The method of claim 16, wherein the performing of the step-by-step notification includes:
- performing a primary notification when the external object approaches a rear-side of a seat occupied by the passenger is detected; and
- performing a secondary notification when it is determined that the passenger has the intent to exit from the vehicle.

20. The method of claim 19, further including performing a door lock control together in the performing of the secondary notification.

* * * * *